United States Patent
Prestros

(10) Patent No.: US 8,690,071 B2
(45) Date of Patent: Apr. 8, 2014

(54) TRANSPONDER

(71) Applicant: NXP B.V., Eindhoven (NL)

(72) Inventor: Ralph Christian Josef Oskar Prestros, Graz (AT)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 13/931,502

(22) Filed: Jun. 28, 2013

(65) Prior Publication Data

US 2014/0001272 A1 Jan. 2, 2014

(30) Foreign Application Priority Data

Jun. 29, 2012 (EP) .................................. 12174402

(51) Int. Cl.
*G06K 19/06* (2006.01)
(52) U.S. Cl.
USPC .......................................... 235/492; 235/451
(58) Field of Classification Search
USPC .................................. 235/492, 451
See application file for complete search history.

(56) References Cited

U.S. PATENT DOCUMENTS

2010/0171369 A1  7/2010  Baarman et al.

FOREIGN PATENT DOCUMENTS

| EP | 0 533 247 A1 | 3/1993 |
| EP | 1 573 662 B1 | 9/2005 |
| WO | 2011/159171 A2 | 12/2011 |

OTHER PUBLICATIONS

Extended European Search Report for Patent Appln. No. 12174402.3 (Dec. 6, 2012).

*Primary Examiner* — Kristy A Haupt

(57) ABSTRACT

A transponder comprising an antenna, such as an antenna coil, is provided for inductively coupling the transponder to a reader, transferring energy from the reader to the transponder, the electromagnetic field alternating with a carrier frequency, a rectifier having an antenna side coupled to the antenna for receiving an alternating current from the antenna and a transponder side for supplying the transponder with a direct current, and optionally a subcarrier modulator for modulating a subcarrier wave with a data signal to obtain a transmit signal. The rectifier modulates the electromagnetic field with the transmit signal so that the transmit signal is transmitted to the reader. By using a rectifier both for converting alternating current to direct current and as an analog mixer, increased range of the transponder is achieved without the need of generation and synchronization of a carrier wave.

11 Claims, 5 Drawing Sheets

TRANSPONDER

CROSS-REFERENCE TO RELATED APPLICATIONS

This application claims the priority under 35 U.S.C. §119 of European patent application no. 12174402.3, filed on Jun. 29, 2012, the contents of which are incorporated by reference herein.

FIELD OF THE INVENTION

The invention relates to a transponder comprising an antenna to receive a reader generated electromagnetic field, transferring energy from the reader to the transponder, the electromagnetic field alternating with a carrier frequency, a rectifier having an antenna side linked to the antenna for receiving an alternating current from the antenna and a transponder side for supplying the transponder with a direct current, and a subcarrier modulator for modulating a subcarrier wave with a data signal to obtain a transmit signal.

BACKGROUND OF THE INVENTION

Transponders, such as RFID or NFC systems, rely on electromagnetic waves exchange and especially in the near-field on inductive coupling with a reader for power and data transmission. The transponder often comprises an electronic data carrying device, usually a single microchip and an antenna, e.g., a large area coil that functions as an antenna.

Data may be transferred from the transponder to the reader using load modulation. If a transponder is placed within the magnetic alternating field of the readers antenna, then this draws energy from the electromagnetic field. This additional power consumption can be measured at the reader. By switching a load resistance at the transponders antenna, data may be transferred through this effect.

However, as transponders are getting smaller, the load modulation effect becomes less effective. A small transponder antenna does not accumulate enough energy from the reader field. Therefore the coil voltage for demodulation is too low even on the transistor used for load modulation. Also the coupling back to the reader is poor.

The data transfer may be improved by adding a battery power supply. In this case active modulation of a carrier wave may be used instead of passive load modulation. This approach has the drawback that the carrier frequency (fc) used for the modulation needs to have exactly the same phase as the carrier frequency that is received by the transponder. Such synchronization is difficult to achieve and requires additional synchronization circuits.

SUMMARY OF THE INVENTION

It would advantageous to have an improved transponder alleviating these and other problems.

A transponder is provided comprising an antenna for receiving a reader generated electromagnetic field, transferring energy from the reader to the transponder, the electromagnetic field alternating with a carrier frequency, a rectifier having an antenna side linked to the antenna for receiving an alternating current from the antenna and a transponder side for supplying the transponder with a direct current, and a data signal source for generating an electronic data signal encoding digital information, wherein the data signal source is coupled to the transponder side of the rectifier, the rectifier modulating the electromagnetic field with the data signal so that the data signal is transmitted to the reader.

The rectifier functions to rectify the alternating current received from the reader and to supply direct current to the transponder. It was an insight of the inventor that a rectifier also functions as an analog mixer. By coupling a data source to the transponder side of the rectifier, the rectifier will modulate the electromagnetic field with the data signal, thus transmitting the data signal, to the reader. The data signal may be modulated on the carrier signal directly, or via a subcarrier modulator that first modulates a subcarrier wave with the data signal. For example, direct modulation may be done by modulating the data signal on the electromagnetic field via amplitude modulation. Direct modulation is particularly advantageous when the transponder is an UHF-RFID. For a UHF-RFID, preferably a UHF-RFID antenna is used for the antenna. The data source may be comprised in a transponder circuit which received power from the rectifier. For example, the data source may be a digital circuit. The data source may generate the data signal, in part, using software, but software is not necessary. The data source may use a conventional baseband signal e.g. using Manchester Coding for to encode digital data. The digital data may comprise an identifier. The bit rate of the data signal may be 106 kBit/s.

An embodiment having a subcarrier modulator is the following: A transponder comprising an antenna for receiving a reader generated electromagnetic field, transferring energy from the reader to the transponder, the electromagnetic field alternating with a carrier frequency, a rectifier having an antenna side coupled to the antenna for receiving an alternating current from the antenna and a transponder side for supplying the transponder with a direct current, and a subcarrier modulator for modulating a subcarrier wave with a data signal to obtain a transmit signal, wherein the subcarrier modulator is coupled to the transponder side of the rectifier, the rectifier modulating the electromagnetic field with the transmit signal so that the transmit signal is transmitted to the reader.

The rectifier functions to rectify the alternating current received from the reader and to supply direct current to the transponder. It was an insight of the inventor that a rectifier also functions as an analog mixer. By coupling a subcarrier modulator to the transponder side of the rectifier, the rectifier will modulate the electromagnetic field with the transmit signal, thus transmitting the transmit signal, and thus the data signal, to the reader.

A subcarrier modulator is necessary, e.g. with UHF-RFID, because the rectifier acting as a mixer could directly modulate the data signal on the carrier signal via amplitude modulation.

In an embodiment the transponder comprises a transponder circuit, coupled to the transponder side of the rectifier. The transponder circuit is configured to perform the tasks of the transponder. For example, the transponder circuit may comprise a non-volatile memory storing an identifier. The transponder circuit may comprise sending circuitry to transmit the identifier to the reader. The transponder circuit may generate the data signal, possibly using some bit code.

In an embodiment, the transponder comprises a voltage source coupled to the transponder side of the rectifier and the transponder circuit. The voltage source drives the transponder circuit. The voltage source provides the transmit power. By using a voltage source the range of the transponder is increased, compared to passive load modulation. The voltage source, e.g. the capacitor, acts as a power supply; as such it is not needed to obtain the mixer functionality of the rectifier. A voltage source, e.g., a battery, may be used giving the advantage of increased range without the disadvantage of needing a synchronization circuit, e.g., a PLL.

In an embodiment, the voltage source is a capacitor arranged for charging from the rectifier. Using a capacitor has the advantage that no battery is needed, yet the advantage of increased range, is still retained. The extension of range through carrier wave modulation was previously only possible in battery powered transponder. On the other hand use of a battery as the voltage source is also possible. Using a battery has the advantage of being independent or less dependent upon the reader's field, while still no synchronization circuit for synchronizing with the carrier frequency is needed. The transponder may also use a rechargeable battery, which may be charged in the reader's field like the capacitor.

The capacitor has to be chosen to smooth the carrier frequency, but not to suppress (smooth) the baseband transmit signal. Such a capacitor may be obtained by using a range of values for the capacitor and observing the smoothing. A capacitor where the smoothing is sufficient for the transponder to function, yet not yet smoothes out the baseband transmit signal may be selected for use. If a higher power is needed, then a second capacitor may be used, separated from the smoothing capacitor with a resistor or a coil. For very high power demand an additional charge pump may be used to load the capacitor to higher levels.

The antenna side of the rectifier comprises two connecting points, for receiving the antenna in between the two connecting points, i.e., the antenna is a parallel to the rectifier's antenna side. The rectifier's transponder side comprises two connecting points. Of the transponder side, one point is referred to as the minus point (−). The other connecting point of the rectifier's transponder side is referred to as the plus point (+). The transponder circuit is connected to the plus point and the minus point (−). The subcarrier modulator may also be connected to the plus point and the minus point (−). The voltage source may be connected between the plus point and the minus point (−). The connecting points are also referred to as 'pins'.

A reservoir capacitor, also known as a smoothing capacitor, lessens the variation in the rectified AC output voltage waveform from the rectifier.

In an embodiment, the rectifier is a full wave rectifier. In an embodiment, the rectifier is a diode bridge. A diode bridge that may be used has four diodes.

In an embodiment a capacitor is connected in parallel with the transponders antenna, the capacitance of which is selected such that it combines with the coil inductance of the antenna coil to form a parallel resonant circuit, with a resonant frequency that corresponds with the carrier frequency of the reader. High currents are generated in the antenna coil of the reader by resonance step-up in the parallel resonant circuit, which can be used to generate the required field strengths for the operation of the remote transponder.

A transponder is provided comprising an antenna, such as an antenna coil, for inductively coupling the transponder to a reader through an electromagnetic field, transferring energy from the reader to the transponder, the electromagnetic field alternating with a carrier frequency, a rectifier having an antenna side coupled to the antenna for receiving an alternating current from the antenna and a transponder side for supplying the transponder with a direct current, and a subcarrier modulator for modulating a subcarrier wave with a data signal to obtain a transmit signal. The subcarrier modulator is coupled to the transponder side of the rectifier so that the rectifier modulates the electromagnetic field with the transmit signal so that the transmit signal is transmitted to the reader. By using a rectifier both for converting alternating current to direct current and as an analog mixer, increased range of the transponder is achieved without the need of generation and synchronization of a carrier wave.

BRIEF DESCRIPTION OF THE DRAWINGS

These and other aspects of the invention are apparent from and will be elucidated with reference to the embodiments described hereinafter. In the drawings.

Figure 1:
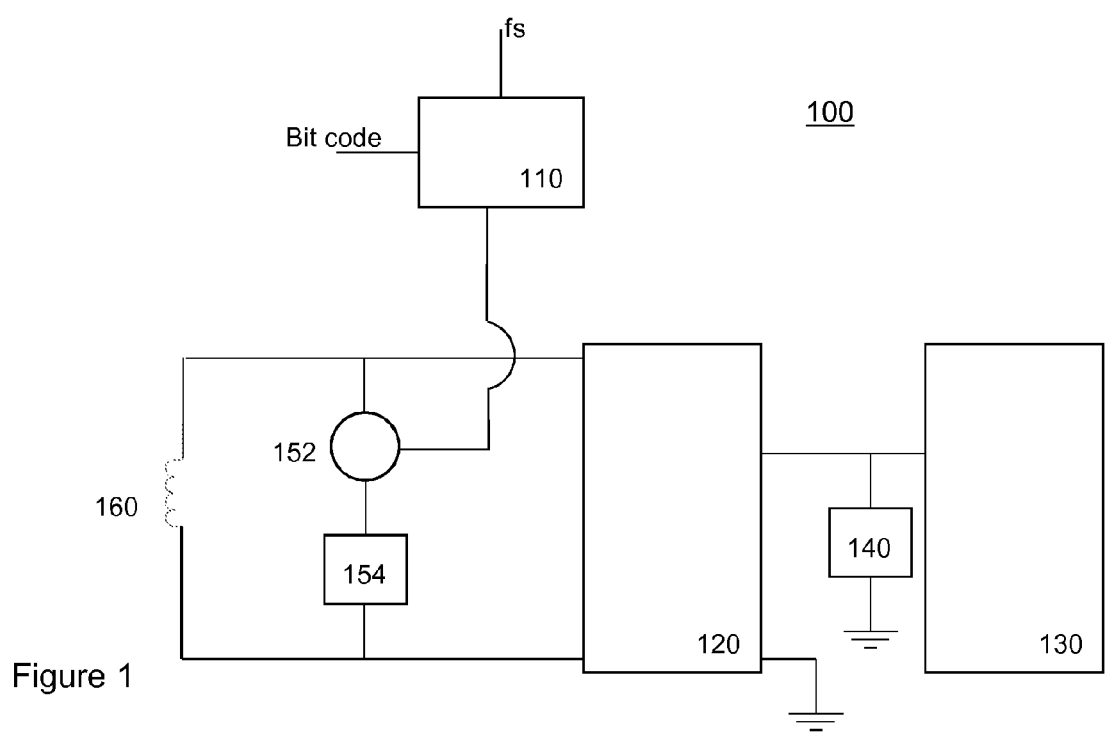
FIGS. 1 and 2 show transponders that do not use a rectifier as an upconverting modulator.

It should be noted that items which have the same reference numbers in different Figures, have the same structural features and the same functions, or are the same signals. Where the function and/or structure of such an item has been explained, there is no necessity for repeated explanation thereof in the detailed description.

LIST OF REFERENCE NUMERALS

| | |
|---|---|
| 100 | a transponder |
| 110 | a sub-carrier modulator |
| 112 | a carrier modulator |
| 120 | a rectifier |
| 130 | a transponder circuit |
| 140 | a capacitor |
| 152 | a switch |
| 160 | an antenna |
| 200, 202 | a transponder |
| 210 | an and-gate |
| 220 | a diode bridge |
| 230 | a transponder circuit |
| 240 | a capacitor |
| 260 | a coil |
| 500 | a rectifier |
| 512-518 | a switch |
| 522 | a plus pin |
| 524 | a minus pin |
| 530 | an antenna side |

DETAILED EMBODIMENTS

While this invention is susceptible of embodiment in many different forms, there is shown in the drawings and will herein be described in detail one or more specific embodiments, with the understanding that the present disclosure is to be considered as exemplary of the principles of the invention and not intended to limit the invention to the specific embodiments shown and described.

FIG. 1 illustrates a transponder 100. Transponder 100 comprises an antenna 160. For example, antenna 160 may be an antenna coil or electric antenna of the transponder. Through antenna 160, the transponder may be inductively coupled to a reader and/or receive a reader signal. Antenna 160 may be an electrical antenna, such as may be used in UHF-RFID. The inductive coupling of the transponder to a reader is without direct electrical contact between the reader and the transponder.

The reader's antenna generates a strong, high frequency electro-magnetic field, which penetrates the cross-section of the area around the antenna 160. The frequency is referred to as the carrier frequency.

Transponder 100 comprises a rectifier 120 for converting alternating current (AC), which periodically reverses direction, to direct current (DC). The direct current powers a transponder circuit 130, and charges a capacitor 140. This means that, all or part, of the energy needed for the operation of the microchip may be provided by the reader. Transponder circuit 130 may be seen as a power supply sink.

Data is which is to be sent from the transponder to a reader is encoded in a bit code. A modulator 110 modulates a subcarrier (denoted fs) with the bit code. The modulation may, e.g., be of ASK, PSK or FSK type. An often used carrier and subcarrier frequency are 13.56 MHz and 847.5 kHz respectively. The output of modulator 110 is referred to as the base-band transponder transmit signal.

Figure 2:
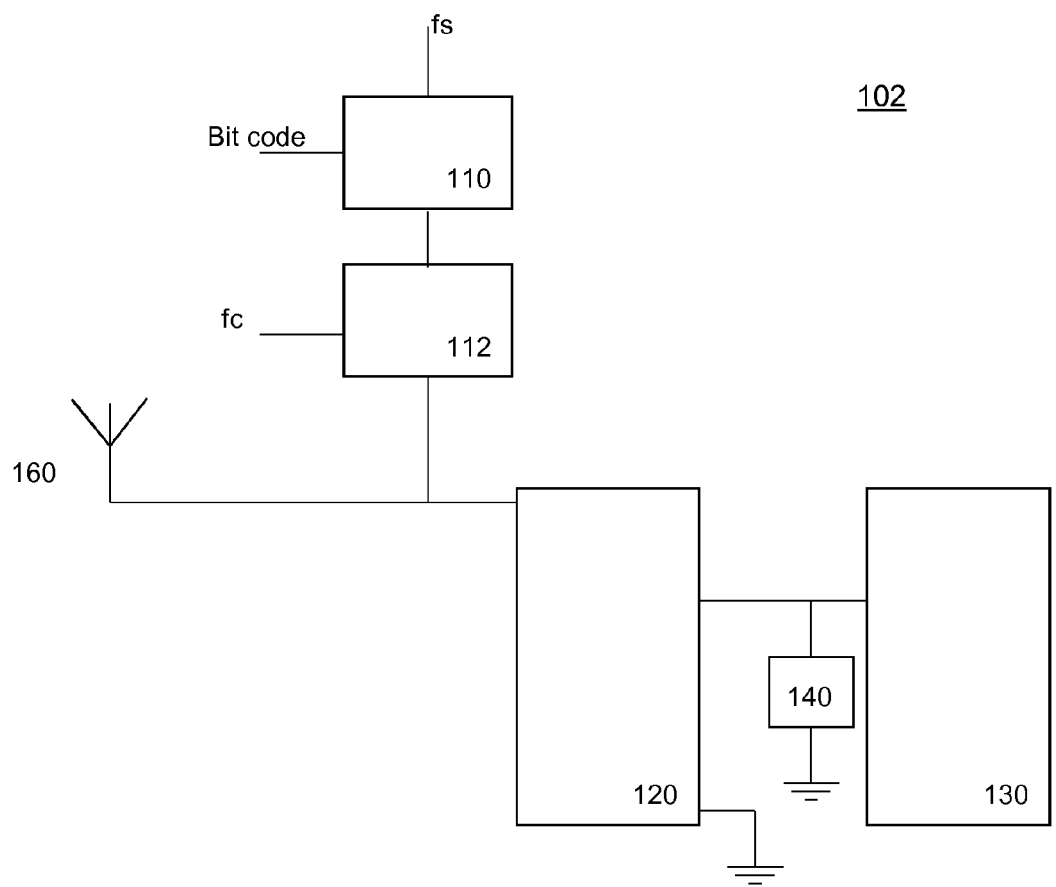

In FIG. 1, the base-band transponder transmit signal selectively connects a resistor 154 parallel to antenna 160 through a switch 152 that may be implemented as a FET. In FIG. 2, the base-band transponder transmit signal modulates a carrier wave, by a second modulator 112. The output of second modulator 112 may be connected directly to antenna 160.

A drawback of FIG. 1 is that the amount of load is limited by what has just been transmitted by the reader, this limits how small antenna 160 can be, and across what distance data may be transferred. A drawback of FIG. 2 is that the carrier wave used by second modulator 112 needs precise synchronization with the carrier wave used by the reader.

Figure 3:
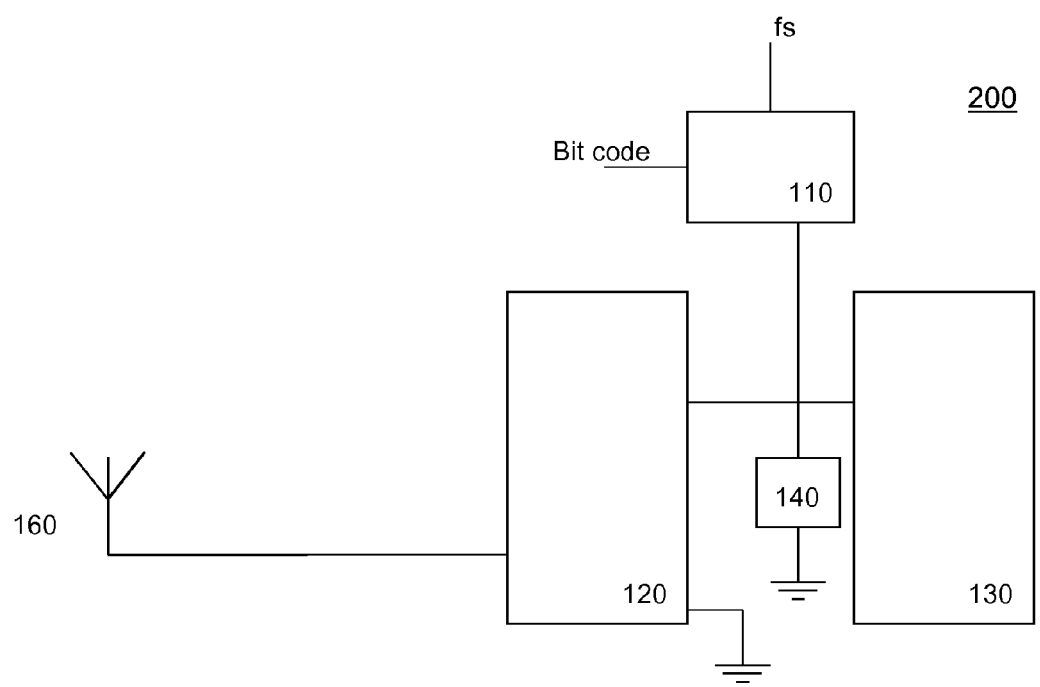
FIGS. 3 and 4 show transponders that use a rectifier as an upconverting modulator.

FIG. 3 illustrates a transponder in which the rectifier has a dual use. On the one hand the rectifier is used to convert the energy obtained from the reader via the inductive field from alternating to direct current. On the other hand the rectifier is also used as an analog mixer for performing an analog multiplication between the base-band transponder transmit signal and the carrier wave.

Transponder 200 comprises a transponder circuit 130 configured to perform whatever task is needed from the transponder. Transponder circuit 130 may comprise memory, for example a non-volatile memory. The non-volatile memory may comprise a non-volatile memory, e.g. storing an identification number. The transponder circuit 130 may comprise digital gates, e.g. configured to compute a response to a message received from the reader.

Like the transponders of FIGS. 1 and 2, the transponder of FIG. 3 comprises an antenna 160, e.g. an antenna coil or an electric antenna, for inductively coupling the transponder to a reader through an electromagnetic field, transferring energy from the reader to the transponder. The electromagnetic field alternates with a carrier frequency. There is no direct electrical contact between the reader and the transponder, energy and information is transmitted wirelessly through the electromagnetic field.

Transponder 200 further comprises a rectifier 120, preferably a full wave rectifier. As in FIGS. 1 and 2 the rectifier has an antenna side coupled to the antenna for receiving an alternating current from the antenna and a transponder side coupled to the transponder circuit for providing a direct current thereto. Rectifier 120 may be, e.g., a diode bridge, a transistor rectifier, a silicon-controlled rectifier (SCR), and the like.

At the antenna side rectifier 120 has two connection points ('pins') coupled to antenna 160. At the transponder side rectifier 120 has two connection points ('pins'), one is referred to as 'minus', the other is referred to as 'plus'. The pins on the transponder side supply a direct current. The pins on the antenna side receive an alternating current from the antenna through the reader generated field. Voltage source 140 runs between the connection points ('pins') at the transponder side of rectifier 120.

During operation, if the transponder is brought in the vicinity of the electromagnetic field from a reader, i.e., an inductive or electromagnetic field, an alternating current is generated in antenna 160. Rectifier 120 converts the alternating current to a direct current, which may be used to power the whole transponder, in particular transponder circuit 130.

Transponder 200 further comprises a capacitor 140. Capacitor 140 is also coupled to rectifier 120. Capacitor 140 is charged by the direct current coming from the rectifier. The charged capacitor 140 may temporarily power the transponder, if the power obtained from the inductive field is temporarily insufficient. Capacitor 140 smoothens the signal coming from rectifier 120.

Transponder 200 further comprises a subcarrier modulator 110 for modulating a subcarrier wave with a data signal to obtain the base-band transponder transmit signal. The modulation preferably uses amplitude or phase modulation. Frequency modulation is also possible. The output of the subcarrier modulator 110 which has the base-band transponder transmit signal is connected to the transponder side of the rectifier 120. A carrier frequency that is sometime used is 13.56 MHz; a subcarrier frequency that is sometimes with that carrier frequency is 847.5 kHz.

During operation when the subcarrier modulator 110 produces a baseband transmit signal, the rectifier receives the baseband signal from modulator 110 at the transponder side. The rectifier acts as a mixer, and modulates the carrier wave received by antenna 160. In this was the baseband signal is upconverted. Note that there is no need to generate the carrier wave by the transponder itself. In particular there is no need for synchronizing with the carrier wave. Note that synchronizing is a relatively complicated operation on a transponder, requiring e.g. a PLL.

Figure 4:
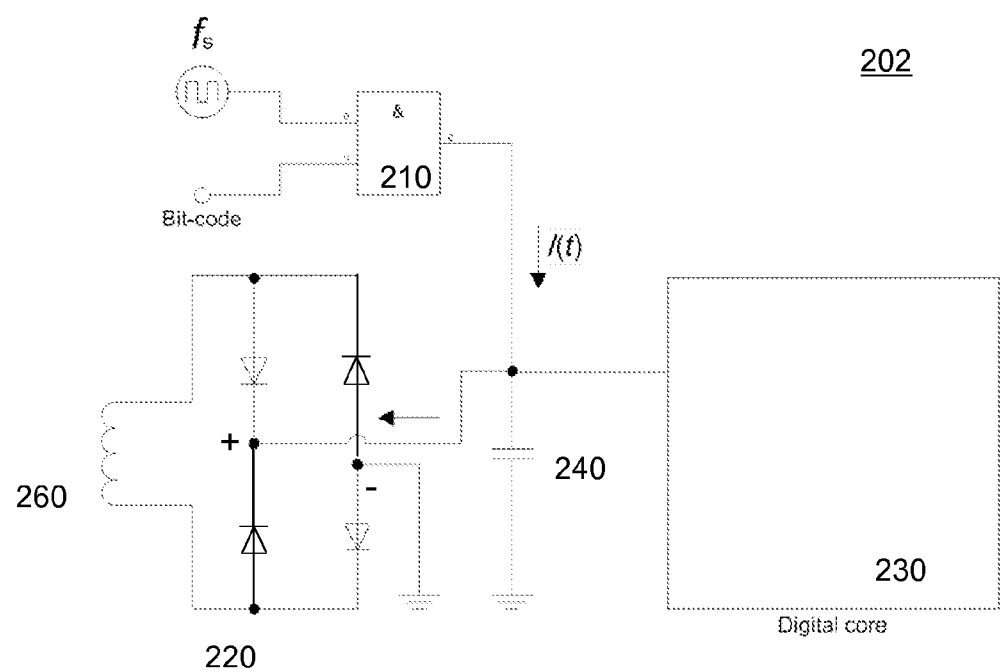

FIG. 4 illustrates a transponder 202 which also uses a rectifier as an upconverting modulator.

Like the transponder of FIG. 3, transponder 202 comprises a subcarrier modulator 210, a rectifier 220, a coil 260, a capacitor 240 and a transponder circuit 230.

In FIG. 4, Subcarrier modulator 110 has been implemented as an 'and gate' 210. And-gate 210 is used for OOK (on off keying) modulation. Instead, Subcarrier modulator 110 may be implemented with an exor-gate for BPSK (binary phase shift) modulation. Modulator 210 has two input gates: one receiving a subcarrier wave, e.g. coming from a subcarrier generator of the transponder (not shown), and a bit-code. The bit-code encodes a digital data signal which is to be sent to the reader. The bit-code is typically generated by the transponder circuit. The bit-code may be encoded, e.g., using Manchester coding.

As an example, the rectifier is implemented in FIG. 4 as a diode bridge. Rectifier 220 has two connection points ('pins') at the antenna side coupled to antenna 260. Rectifier 220 has two connection points ('pins') at the transponder side, one is referred to as 'minus', the other is referred to as 'plus'. The pins on the transponder side supply a direct current. The pins on the antenna side receive an alternating current. Capacitor 240 runs between the connection points ('pins') at the transponder side of rectifier 220.

The output of modulator 210, having the baseband transmit signal, is coupled to 'minus' via capacitor 240, and to the plus pin of the transponder side of rectifier 220.

In FIG. 4, rectifier 220 is implemented as a diode bridge. A diode bridge is a specific implementation of a rectifier. Diode bride 220 comprises 4 diodes. Rectifier 220 has an antenna side, having two inputs coupled in parallel to antenna coil 260 and a transponder side having two output pins. One of the outputs is referred to a 'ground'. The diode bridge functions as a rectifier for the alternating current received from the coil.

Surprisingly, the diode bridge also functions as a diode mixer for the baseband transmit signal received at the transponder side.

Capacitor 140 and 240 in FIGS. 3 and 4 respectively may be replaced more generally with a voltage source, e.g., by a battery to improve the range over which the transponder may be received. Even in this case no synchronization with the carrier wave is needed.

Figure 5:
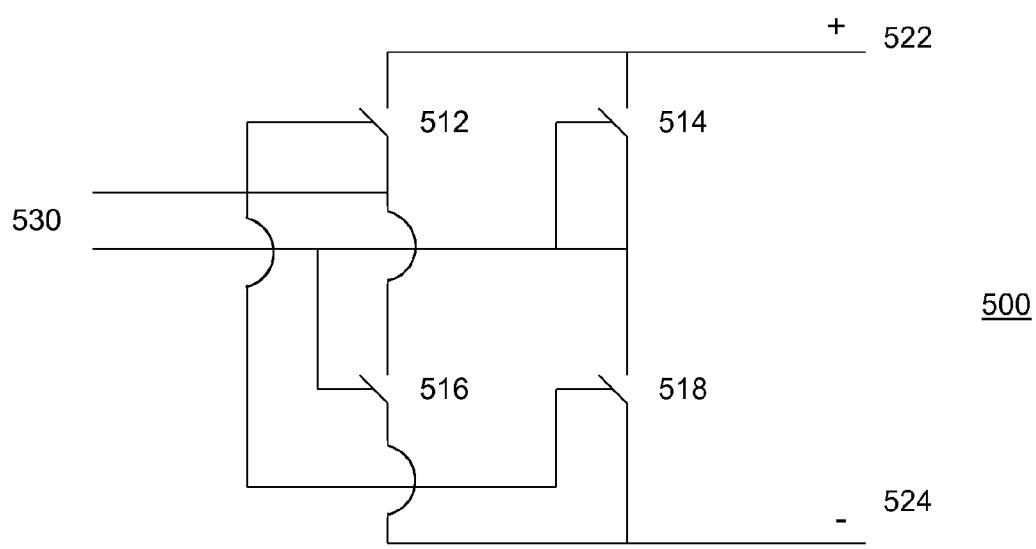
FIG. 5 shows a rectifier for use in FIG. 3 or 4.

FIG. 5 show a rectifier 500 that may be used for rectifier 120, or in place of rectifier 220. The rectifier is a bridge comprising 4 'switches'. The rectifier of FIG. 5 comprises 4 switches 512, 514, 516 and 518 arranged as a bridge. The switches 512-518 may be implemented with MOSFETs. A plus point is indicated with 522. A minus point is indicated with 524. The alternating current is connected at 530.

Rectifier 500 may be used in FIG. 3 to implement rectifier 120. A coil 160 or antenna would be connected at 530. Capacitor 140 and transponder circuit 130 connected between plus 522 and minus 524. Rectifier 500 may also be used in FIG. 4 to replace Diode Bridge 220.

It should be noted that the above-mentioned embodiments illustrate rather than limit the invention, and that those skilled in the art will be able to design many alternative embodiments.

In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention claimed is:

1. A transponder comprising
   an antenna for receiving a reader generated electromagnetic field, transferring energy from the reader to the transponder, the electromagnetic field alternating with a carrier frequency,
   a rectifier having an antenna side linked to the antenna for receiving an alternating current from the antenna and a transponder side for supplying the transponder with a direct current, and
   a data signal source for generating an electronic data signal encoding digital information, wherein
   the data signal source is coupled to the transponder side of the rectifier, the rectifier modulating the electromagnetic field with the data signal so that the data signal is transmitted to the reader,
   wherein the transponder further comprises
   a subcarrier modulator for modulating a subcarrier wave with the data signal to obtain a transmit signal, and wherein
   the subcarrier modulator is coupled to the transponder side of the rectifier, the rectifier modulating the electromagnetic field with the transmit signal so that the transmit signal is transmitted to the reader.

2. A transponder as in claim 1, wherein the rectifier is configured to modulate the data signal on the electromagnetic field via amplitude modulation.

3. A transponder as in claim 1, wherein the transponder is an UHF-RFID.

4. A transponder as in claim 1, wherein the antenna comprises a coil for inductively coupling the transponder to a reader through the electromagnetic field.

5. A transponder as in claim 1, comprising a transponder circuit coupled to the transponder side of the rectifier.

6. A transponder as in claim 1, comprising a voltage source coupled to the transponder side of the rectifier and the transponder circuit, the voltage source driving the transponder circuit.

7. A transponder as in claim 6, wherein the voltage source is a capacitor arranged for charging from the rectifier.

8. A transponder as in claim 6, wherein the voltage source is a battery.

9. A transponder as in claim 1, wherein the rectifier is a full wave rectifier.

10. A transponder as in claim 1, wherein the rectifier is a diode bridge.

11. A transponder as in claim 1, wherein the rectifier is a transistor rectifier or a silicon-controlled rectifier (SCR).

* * * * *